United States Patent
Kaszas et al.

(10) Patent No.: US 6,204,338 B1
(45) Date of Patent: *Mar. 20, 2001

(54) POLYMER BROMINATION PROCESS

(75) Inventors: Gabor Kaszas, Corunna (CA); Wolfgang Baade, Wildeshausen; Heinrich Konigshofen, Bergisch Gladbach, both of (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,404

(22) Filed: Nov. 19, 1998

Related U.S. Application Data

(62) Division of application No. 08/804,775, filed on Feb. 24, 1997, now Pat. No. 5,883,198.

(30) Foreign Application Priority Data

Apr. 23, 1996 (CA) .................................................. 2174795

(51) Int. Cl.$^7$ ........................................................ C08F 8/22
(52) U.S. Cl. .......................................... 525/332.8; 525/356
(58) Field of Search ............................................ 525/332.8

(56) References Cited

U.S. PATENT DOCUMENTS

| | | | |
|---|---|---|---|
| 2,944,578 | 7/1960 | Baldwin et al. | 152/330 |
| 3,011,996 | 12/1961 | Kuntz et al. | 260/41.5 |
| 3,018,275 | 1/1962 | Cottle | 260/85.3 |

*Primary Examiner*—Bernard Lipman
(74) *Attorney, Agent, or Firm*—Joseph C. Gil; Noland J. Cheung

(57) ABSTRACT

An improved process is provided for the bromination of isoolefin-conjugated diolefin polymers by brominating said polymer in solution in a solvent comprising a mixture of an inert saturated paraffinic hydrocarbon and an inert halogen-containing hydrocarbon. There is also provided an improved product of said process wherein the brominated polymer contains not less than 70 percent of the bound conjugated diolefin units which are brominated and also not less than 80 percent of the bound bromine atoms are in a form suitable to participate in the vulcanization of said polymer.

5 Claims, No Drawings

POLYMER BROMINATION PROCESS

This application is a divisional application of Ser. No. 08/804,775 filed Feb. 24, 1997 now U.S. Pat. No. 5,883,198.

FIELD OF THE INVENTION

This invention relates to an improved process for the bromination of isoolefin polymers and to the product produced by such an improved process.

BACKGROUND OF THE INVENTION

Isoolefin polymers have been known for many years and are commercially available as polymers of an isoolefin and a conjugated diolefin, especially of isobutylene and isoprene. While such polymers have a wide range of desired properties they are not readily covulcanizable with highly unsaturated polymers, such as polymers containing high proportions of one or more conjugated diolefin. In order to overcome such a problem, isoolefin-conjugated diolefin polymers, and especially isobutylene-isoprene polymers which are also known as butyl polymers, have been halogenated. The halogenation, especially chlorination or bromination, is achieved by treating the butyl polymer in solution in an inert organic solvent with controlled quantities of chlorine or bromine. The resulting halogenated butyl polymer has the inherent satisfactory properties of the butyl polymers while also being covulcanizable with the highly unsaturated polymers.

The halogenation process is well known to be rather inefficient. One reason for the inefficiency is that for every atom of chlorine or bromine that is incorporated into the polymer a molecule of hydrogen chloride or hydrogen bromide is formed. Another reason is that some of the hydrogen chloride or hydrogen bromide may add to the polymer forming a chemically undesirable group. A further reason is that the actual efficiency of utilization of the chlorine or bromine is quite low, generally being of the order of about 25 to about 40 percent by weight.

DESCRIPTION OF THE PRIOR ART

The preparation of butyl polymers is well known wherein a mixture of an isoolefin, preferably isobutylene, and a conjugated diolefin, preferably isoprene, in an inert diluent, preferably methyl chloride, is reacted at a temperature of from about $-80°$ C. to about $-120°$ C. in the presence of a Friedel-Crafts catalyst, preferably aluminum chloride. The butyl polymer so produced contains about 95 to about 99.5 mole percent of isobutylene and from about 0.5 to about 5 mole percent of isoprene. Such a polymer is dissolved in an organic solvent and reacted, at about $10°$ C. to about $60°$ C., with, preferably, chlorine or bromine for sufficient time to yield a polymer containing not more than 1 atom of combined chlorine per double bond in the polymer or not more than 3, and preferably not more than 1, atoms of combined bromine per double bond in the polymer—see for example U.S. Pat. Nos. 2,944,578 and 3,011,996. U.S. Pat. No. 3,018,275 describes a process for the halogenation of butyl polymers wherein an oxidizing agent, including a material selected from hydrogen peroxide, sodium peroxide, sodium chlorate or bromate and sodium hypochlorite, is present during the halogenation process to increase the utilization of the halogenating agent in the process.

SUMMARY OF THE INVENTION

It is an objective of this invention to provide an improved process for the bromination of isobutylene polymers by increasing the utilization of the bromine in the process.

It is another objective of this invention to provide an improved brominated butyl polymer by use of the improved process.

Accordingly, one aspect of the invention provides an improved process for the bromination of a $C_4$–$C_6$ isoolefin-$C_4$–$C_6$ conjugated diolefin polymer which comprises preparing a solution of said polymer in a solvent, adding to said solution bromine and reacting said bromine with said polymer at a temperature of from about $10°$ C. to about $60°$ C. and separating the brominated isoolefin-conjugated diolefin polymer, the amount of bromine being from about 0.30 to about 1.0 moles per mole of conjugated diolefin in said polymer, the improvement being that said solvent is a mixture comprising an inert saturated paraffinic hydrocarbon and an inert halogen-containing hydrocarbon in a volume ratio of from about 90/10 to about 10/90 of said paraffinic hydrocarbon to said halogen-containing hydrocarbon, wherein said halogen-containing hydrocarbon is a mono-, di- or tri-halogenated $C_1$ to $C_6$ paraffinic hydrocarbon or a halogenated aromatic hydrocarbon.

In another aspect of the invention, the inert mixture has a dielectric constant of at least about 2.5, and preferably greater than about 3.0.

In a further aspect of the invention, the inert saturated paraffinic hydrocarbon and the inert halogen-containing hydrocarbon are present in a ratio of from about 90/10 to about 50/50, and more preferably in a ratio of from about 90/10 to about 70/30.

In one aspect, the present invention provides an improved process for the bromination of a $C_4$–$C_6$ isoolefin-$C_4$–$C_6$ conjugated diolefin polymer which comprises preparing a solution of said polymer in a solvent, adding to said solution bromine and reacting said bromine with said polymer at a temperature of from about $10°$ to about $60°$ C. and separating the brominated isoolefin-conjugated diolefin polymer, the amount of bromine being from about 0.3 to about 1.0 moles per mole of conjugated diolefin in said polymer, the improvement being that said solvent is a mixture comprising an inert saturated paraffinic hydrocarbon and an inert halogen-containing hydrocarbon in a volume ratio of from about 90/10 to about 10/90 of said paraffinic hydrocarbon to said halogen-containing hydrocarbon, wherein said halogen-containing hydrocarbon is selected from the group consisting of methyl chloride, methylene chloride, ethyl chloride, ethyl bromide, dichioroethane, n-butyl chloride and monochloro-benzene.

In particular aspects, the ratio of saturated paraffinic hydrocarbon to halogen-containing hydrocarbon is preferably from about 90/10 to about 50/50, and more preferably from about 90/10 to about 70/30.

In another aspect, the solvent further contains up to 20 volume percent of water.

One aspect of the invention provides for the process wherein the solvent further contains up to 20 volume percent of an aqueous solution of an oxidizing agent. The oxidizing agent is soluble in water and is suitable to oxidize the hydrogen bromide to bromine in the process substantially without oxidizing the polymeric chain. In a particular aspect, the oxidizing agent is an oxygen containing oxidizing agent selected from the group comprising sodium hypochlorite, hydrogen peroxide, sodium peroxide, sodium chlorate, bromate, or other suitable oxidizing agents.

In one aspect, the solvent contains up to 20 volume percent of an aqueous solution of sodium hypochlorite, the amount of sodium hypochlorite being equivalent to not more than about 200 percent of the moles of bromine added.

In a further aspect, this invention provides an improved brominated isoolefin-conjugated diolefin polymer produced by the aforesaid process wherein the brominated polymer contains from about 1 to about 4 weight percent of bromine based on the brominated polymer and not less than about 80 percent of the bound bromine atoms are present in a form suitable to participate in the vulcanization of said polymer and not less than about 70 percent of the 1,4-isoprene units in the original isoolefin-conjugated diolefin polymer are converted in the brominated polymer into a form suitable to participate in the vulcanization of said polymer.

DETAILED DESCRIPTION OF THE INVENTION

Isoolefin-conjugated diolefin polymers are well known in the art as also is the process for the manufacture of such polymers. Isoolefins are selected from the $C_4$ to $C_6$ isoolefins with isobutylene being the preferred isoolefin. Conjugated diolefins are selected from the $C_4$ to $C_6$ conjugated diolefins with isoprene being the preferred conjugated diolefin. Such polymers comprise from about 95 to about 99.5 mole percent of the isoolefin, preferably from about 97 to about 99.5 mole percent of isobutylene, and from about 0.5 to about 5 mole percent of conjugated diolefin, preferably from about 0.5 to about 3 mole percent of isoprene. The polymer is prepared by the cationic polymerization of the isoolefin and conjugated diolefin, in an inert diluent which is preferably methyl chloride or ethyl chloride, at a temperature of from about −80° C. to about −120° C. in the presence of a Friedel-Crafts catalyst which is preferably aluminum chloride.

For the prior art bromination process, the polymer is dissolved in an inert hydrocarbon solvent such as pentane, hexane and heptane and the solution is fed to a halogenation reactor. The halogenation reactor is typically a vessel equipped with inlet and outlet lines and an agitator. Bromine is also fed to the halogenation reactor at a controlled rate in relation to the amount of polymer and the double bond content of the polymer. The material from the reactor is treated with an aqueous alkaline solution, such as sodium hydroxide, to neutralize the hydrogen bromide formed in the halogenation reaction and to react with residual bromine and then contacted with hot water and steam to remove the solvent and produce a slurry of brominated polymer in water which is then handled in a conventional manner to yield the essentially dry brominated polymer. Stabilizers for the brominated polymer may be added during the recovery process.

Such prior art processes exhibit poor utilization of the bromine in the halogenation process, due to the formation of one molecule of hydrogen bromide for each atom of bromine incorporated into the polymer, due to the addition of a small amount of the hydrogen bromide into the polymer and due to the need to use more bromine than is actually incorporated into the polymer.

We have now discovered that the halogenation process can be significantly improved by the use as the solvent for the polymer of a mixture comprising an inert saturated paraffinic hydrocarbon and an inert halogen-containing hydrocarbon. Said paraffinic hydrocarbon is the same as that used in the prior art and is selected from the group consisting of pentane, hexane and heptane. The halogen-containing hydrocarbon is a polar material and is a mono-, di-, or tri-halogenated $C_1$ to $C_6$ paraffinic hydrocarbon or a halogenated aromatic hydrocarbon. Preferably, the halogen-containing hydrocarbon is selected from the group consisting of methyl chloride, methylene chloride, ethyl chloride, ethyl bromide, dichloroethane, n-butyl chloride and monochlorobenzene. The volume ratio of said paraffinic hydrocarbon to halogen-containing hydrocarbon is from about 90 parts to 10 parts to about 10 parts to 90 parts. Preferably, the volume ratio is from about 90/10 to about 50/50 of paraffinic hydrocarbon to halogen-containing hydrocarbon, and most preferably the volume ratio is from about 90/10 to about 70/30 of paraffinic hydrocarbon to halogen-containing hydrocarbon. The solvent may also contain up to about 20, preferably from about 3 to about 15, volume percent, based on the total solvent, of water. Further, the solvent may also contain up to about 20, preferably from about 3 to about 15, volume percent, based on the total solvent, of an aqueous solution of an oxidizing agent such as an oxygen containing oxidizing agent selected from the group comprising sodium hypochlorite, hydrogen peroxide, sodium peroxide, sodium chlorate or bromate. The oxidizing agent is soluble in water and is suitable to oxidize the hydrogen bromide to bromine in the process substantially without oxidizing the polymeric chain. Weak oxidizing agents at low concentration, such as sodium hypochlorite, are preferred in order to prevent or minimize oxidation of the polymer. Preferably, the oxidizing agent will comprise an aqueous solution of sodium hypochlorite, the amount of sodium hypochlorite being equivalent to not more than about 200, preferably from about 100 to about 140, percent of the moles of bromine added to the process.

Using such a mixture as solvent for the polymer leads to an increase in the amount of bromine which is incorporated into the polymer to form chemical structures that participate in the vulcanization of said polymer. We have found that for a fixed reaction time in the process of the present invention in excess of about 85 mole percent of the bromine supplied to the process is incorporated into the polymer to form chemical structures that participate in the vulcanization of the polymer. In contrast, in the prior art only about 60 to 70 mole percent of the bromine is so incorporated. When the solvent comprises paraffinic hydrocarbon and halogen-containing hydrocarbon, the improvement in the utilization of bromine to form the desired chemical structures is evident at a volume ratio of 90/10, and even more so at 80/20, up to about 50/50, up to about 40/60, and up to about 10/90. When the solvent comprises paraffinic hydrocarbon, halogen-containing hydrocarbon and water, the improvement in the utilization of bromine to form the desired chemical structures is somewhat greater—this is believed to be due to the hydrogen bromide formed in the reaction being preferably soluble in the water and thus not so readily available to form hydrogen bromide addition structures. When the solvent comprises paraffinic hydrocarbon, halogen-containing hydrocarbon and an aqueous solution of sodium hypochlorite, the improvement in the utilization of bromine to form the desired chemical structures may be considerably greater, up to as high as about 190 mole percent of the bromine supplied to the process—this is believed to be due to the hydrogen bromide formed in the reaction being oxidized by the sodium hypochlorite to form bromine which may then further react with the polymer.

Without intending to limit the scope of the invention, the bromine utilization improvement is believed to be achieved by the increase of the dielectric constant of the reaction medium via the addition of select halogen-containing hydrocarbon to the solution of the isoolefin-conjugated diolefin polymers prepared in an inert hydrocarbon solvent. It appears that the dielectric constant of the halogen-containing hydrocarbon may be used as a guide for the selection of solvent and determination of the required amount of the halogen-containing hydrocarbon in the mixture in order to achieve improved bromine utilization. Table A lists the dielectric constant of some halogen-containing hydrocarbon solvents and hexane. On this theory, it is apparent from the table that not all the halogen-containing hydrocarbons are suitable for the process of this invention. For example the dielectric constant of carbon tetrachloride is just slightly higher than that of hexane, therefore only marginal improvement can be expected regardless of the composition of the mixture. On the other hand, small amounts of methylene chloride are sufficient to increase the dielectric constant of the reaction mixture significantly due to its high dielectric constant. For example, addition of about 30 vol % carbontetrachloride would increase the dielectric constant only to 1.96 from 1.85. The addition of the same amount of methylene chloride would result in a mixture having a dielectric constant of 3.82. Dielectric constant of a mixture may be easily calculated using the following formula:

$$\epsilon_{mixt.} = \epsilon_1 * \Phi_1 + \epsilon_2 * \Phi_2$$

where $\epsilon_{mixt.}$, $\epsilon_1$ and $\epsilon_2$ are the dielectric constant of the mixture, component one and two, and $\Phi_1$ and $\Phi_2$ are the volume fractions of component one and two.

TABLE A

Dielectric constant for some solvents

| Halogenated Solvent | Dielectric Constant @ 45° C. |
|---|---|
| Hexane | 1.85 |
| Carbon tetrachloride | 2.19 |
| Chloroform | 4.38 |
| Bromobenzene | 5.11 |
| Chlorobenzene | 5.30 |
| n-Butyl chloride | 6.42 |
| Bromoethane | 8.16 |
| Methylene chloride | 8.23 |
| Methyl chloride | 8.64 |
| Dichloroethane | 9.17 |

From the results of Experiment #2 it can be estimated that increasing the dielectric constant to about 2.5 is sufficient to obtain significant improvement. Exceptional results however will be achieved in a mixture in which the dielectric constant is higher than about 3, as is shown in Experiment #3 where $\epsilon_{mixt}=3.1$.

Such a discovery means that the amount of bromine supplied to the process may be reduced, that the amount of excess bromine leaving the halogenation reactor with the brominated polymer may be reduced which in turn reduces the quantity of aqueous alkaline solution required to react with it, that the amount of bromine chemically bound in the polymer may be more effectively used in the subsequent vulcanization process and that the unsaturation level in the polymer (that is the amount of bound conjugated diolefin) may be reduced because with the more complete utilization of the bromine more of the unsaturated double bonds in the polymer are effectively brominated than in the prior art processes.

The desired chemical structures in the brominated polymer include the exo allylic bromide structure, the endo allylic bromide structure and the re-arranged exo allylic bromide structure. In all of these cases the bromine atom is present attached to a carbon atom which is in an allylic configuration with a carbon-carbon double bond (i.e., C=C—CBr) wherein exo and endo have the conventional meaning. In these cases, the bromine atom is chemically very active and participates in the subsequent vulcanization process. In contrast when hydrogen bromide adds to a carbon-carbon double bond, the bromine atom in that configuration is chemically much less active in the subsequent vulcanization process. The quantities of these various chemical structures may be readily determined by 500 MHz HNMR with high levels of accuracy. The exo allylic bromide structure is the predominant one and usually forms about 75 to about 85 percent of the desired chemical structures. The total primary structure thus refers to the total of the exo allylic bromide, the endo allylic bromide and the re-arranged allylic bromide and the product of the present process contains not less than about 80 percent of the bound bromine atoms in these configurations which are the form to actively participate in the subsequent vulcanization process. The process of the present invention leads to a high conversion of the bound 1,4-isoprene units into the primary structure. The present process leads to such conversions of not less than 70 and up to about 90 or more percent into the primary structure whereas the prior art processes lead to such conversions of only about 50 to about 60 percent. The total primary structure as a percentage of the bound 1,4-isoprene units clearly shows the above effect.

The bromination process may be operated at a temperature of from about 10° C. to about 60° C., preferably from about 20° C. to about 50° C. and the reaction time may be from about 1 to about 10 minutes, preferably from about 1 to about 5 minutes. The pressure in the halogenation reactor may be from about 0.8 to about 10 bar.

The bromination polymer recovered from the halogenation process typically has a molecular weight, expressed as the Mooney viscosity (ML 1+8 at 125° C.), of from about 25 to about 55. Brominated polymer such as bromobutyl polymer contains from about 0.5 to about 3, most preferably from about 1 to about 2, mole percent of isoprene and from about 97 to about 99.5, most preferably from about 98 to about 99, mole percent of isobutylene based on the hydrocarbon content of the polymer, and from about 1 to about 4, preferably from about 1.5 to about 3, weight percent of bromine based on the bromobutyl polymer. Further, the product of the present process contains not less than about 80 percent of the bound bromine atoms in a form suitable to participate in the vulcanization of the polymer. In the product of the prior art, a small amount of the bound bromine is present in the polymer as a result of the addition of a hydrogen bromide molecule across a carbon—carbon double bond thereby forming a saturated group in which the bromine atom is essentially inert in the vulcanization process. In the product of the present process, the amount of bound bromine present in the polymer as a result of the addition of a hydrogen bromide molecule across a carbon—carbon double bond is reduced from that of the prior art. Analysis of the polymer by 500 MHz HNMR was the method used to determine the structural composition of the brominated polymers. In isobutylene-isoprene polymers, the isoprene bound in the 1,4-configuration in the HNMR spectrum exhibits a resonance at about 5.1 ppm. In the brominated isobutylene-isoprene polymers, the HNMR spectrum exhibits resonances at about 5.4, 5.05 and 4.35 ppm which correspond to the exo allylic bromide structure, at about 5.6 ppm which correspond to the endo allylic bromide structure, at about 4.08 and 4.10 ppm which correspond to the re-arranged exo allylic bromide structure. The hydrobrominated structure is calculated from the mass balance. Also in the product of the present process, the proportion of the carbon-carbon double bonds that have been reacted with a bromine atom (to form an unsaturated bromine containing group which is active in the vulcanization process) is much higher than is the case for the product of the prior art processes. Hence the product of the present process contains a higher proportion of the bound bromine atoms in a form suitable to participate in the vulcanization process.

The brominated polymer is used to make vulcanizates. The vulcanization of polymers is well known. Carbon black is well known in the art for the reinforcement of vulcanizates and is added to the polymer during the compounding process. Hydrocarbon extender oils are also well known materials used in the compounding process. Generally the carbon black will be selected from the furnace and channel carbon blacks and may be used in amounts of from about 20 to about 90 parts by weight per 100 parts by weight of polymer. Hydrocarbon extender oils may be selected from the paraffinic, naphthenic and aromatic oils, preferably from the paraffinic and naphthenic oils, and may be used in amounts from about 5 to about 40 parts by weight per 100 parts by weight of polymer. The vulcanization systems for use with the present product are those already known in the art for use with bromobutyl polymers and generally will include a metal oxide, at least one sulphur based accelerator and, optionally, elemental sulphur. A suitable metal oxide is zinc oxide used in an amount of from about 1 to about 7 parts by weight per 100 parts by weight of polymer. Suitable sulphur based accelerators may be selected from the thiuram sulphides, the thiocarbamates, the thiazyl compounds and the benzothiazyl compounds. The amounts of such accelerators may be from about 0.3 to about 3 parts by weight per 100 parts by weight of polymer. Elemental sulphur may be present in an amount up to about 2 parts by weight per 100 parts by weight of polymer. Various stabilizers, antioxidants, tackifiers, etc. may also be added during the compounding process. The compounding itself will be by conventional methods using a rubber mill or an internal mixer, controlling the temperature to keep it below about 80° C., in one or two stages, generally with the cure active components being added last. The so-formed compounds are then shaped and vulcanized by heating for from about 5 to about 60 minutes at temperatures of from about 150° C. to about 200° C.

The following examples are provided to illustrate the present invention and are not intended to limit the scope thereof.

EXAMPLES

Example 1

20 g of an isobutylene-isoprene polymer, which contained 1.75 mole percent of isoprene, was dissolved in 270 ml of pure hexane or pure hexane/pure dichloromethane mixture and transferred into a 0.5 L glass reactor equipped with a stirrer and two ports for addition of reagents. To one of the ports was attached a syringe containing 0.93 g of pure bromine in 10 ml of hexane. To the other port was attached a syringe containing 10 ml of a 6.4 weight percent aqueous solution of sodium hydroxide. The temperature was about 23° C. The reaction mixture was protected from light to avoid high induced bromination of the polymer or solvent. The agitator was started, the bromine solution was added with the agitator still running and at the end of the desired reaction time (2 minutes) the sodium hydroxide solution was added to stop the reaction. The agitator was stopped after a further two minutes and a small portion of polymer stabilizers in hexane was added. The solution was washed with distilled water until neutral, a further small portion of polymer stabilizers in hexane was added and the brominated polymer was recovered by removing the bulk of the solvent in a rotary evaporator followed by final drying in a vacuum oven.

Details are provided in Table I. Study of the results clearly shows that when the dichloromethane reached 20 volume percent of the solvent that the exo structure, the bromine content and total primary structures had essentially reached a maximum and that the unreacted isoprene and the hydrobrominated structure had essentially reached a minimum. The data were obtained by analysis of 500 MHz HNMR spectra except for the bromine content which was determined by an oxygen combustion method. The HNMR spectra showed the significant reduction in the resonance for the 1,4-bound isoprene enchainment at about 5.1 ppm and the significant increase in the exo structure at about 5.4, 5.05 and 4.35 ppm. The total primary structure as a percent of the total bromine present is a measure of the amount of bound bromine atoms in a form suitable to participate in the vulcanization of the polymer.

Example 2

Two different samples of isobutylene-isoprene polymers were brominated by the process of the invention using a hexane-dichloro-methane mixture as the solvent. The procedures as described in Example 1 were utilized for the bromination and for the analytical data. The polymers were compounded by mixing 100 parts by weight of polymer with 60 parts by weight of furnace black (N660), 4 parts by weight of a tackifying resin (Pentalyn A), 7 parts by weight of paraffin oil (SUNPAR 2280), 1 part by weight of stearic acid, 1.3 parts by weight of mercapto-benzothiuram sulphide (Vulkacit DM/C), 0.5 parts by weight of sulphur and 3 parts by weight of zinc oxide, the compounded mixture was formed into sheets and vulcanized by heating. The details are provided for the bromination, the brominated polymer characteristics and the vulcanizate properties in Table II. The essentially complete utilization of the isoprene and the low level of hydrobrominated structure are clearly demonstrated.

TABLE 1

| Expt. # | 1 | 2 | 3 | 4 | 5 | 6 |
|---|---|---|---|---|---|---|
| CH$_2$Cl$_2$ content of solvent (vol. %) | 0 | 10 | 20 | 40 | 50 | 60 |
| Reaction time (min.) | 2 | 2 | 2 | 2 | 2 | 2 |
| Product Composition | | | | | | |
| Exo structure (mole %) | 0.86 | 1.15 | 1.36 | 1.38 | 1.38 | 1.37 |
| Total primary structure (mole %) | 0.97 | 1.24 | 1.44 | 1.43 | 1.50 | 1.44 |
| Unreacted isoprene (mole %) | 0.48 | 0.24 | 0.15 | 0.15 | 0.12 | 0.14 |
| Hydrobrominated structure (mole %) | 0.3 | 0.27 | 0.16 | 0.17 | 0.17 | 0.17 |
| Bromine content wt. % | 1.82 | 2.30 | 2.57 | 2.51 | 2.45 | 2.50 |
| Bromine utilization mole % | 60.0 | 76.0 | 89.6 | 88.6 | 93.2 | 89.6 |
| Total primary structure as % of total bromine present % | 76 | 82 | 90 | 89 | 90 | 89 |

Example 3

Methyl chloride was used as the chlorine-containing hydrocarbon, the details being shown in Table III, the temperature of the bromination reaction also being about 23° C., using the procedure described in Example 1.

Example 4

To a 0.5 L glass reactor, equipped as described in Example 1, was added a solution of 20 g of butyl polymer (an isobutylene-isoprene polymer containing 1.77 mole percent of isoprene) in 270 ml of solvent. The solvent used is shown in Table IV. The polymer solution, with the agitator in operation, was heated to 45° C. following which 18 ml of water or of an aqueous sodium hypochlorite solution was added and dispersed thoroughly throughout the solution. To this was added 0.18 ml of bromine and agitation of the mixture was continued. After a reaction time of two minutes, the reaction was stopped by the addition of 20 ml of a 6% solution of sodium hydroxide in water. Stabilizers for the polymer were added and the brominated polymer was recovered as described in Example 1.

Analysis of the polymer by 500 MHz HNMR gave the results shown in Table IV. Experiment #10 was a control because only hexane and water was used as the solvent. The improvements in the nature of the product are clearly seen in the results.

Example 5

Using the polymer and procedure described in Example 4, the solvent was a mixture of hexane and carbon tetrachloride (190 ml and 80 ml respectively) and, for Experiment #13 18 ml of water and for #14, aqueous sodium hypochlorite (18 ml). This Example is a control and illustrates that the improvements of the present process are not achieved when carbon tetrachloride is used instead of a halogen-containing hydrocarbon as shown by the data in Table V.

TABLE II

| Expt. # | 7 | 8 |
|---|---|---|
| Wt. of polymer (g) | 300 | 300 |
| Isoprene content of polymer (mole %) | 0.76 | 1.05 |
| Volume of solvent (ml) | 3700 | 3700 |
| Vol. % $CH_2Cl^2$ in solvent | 30 | 30 |
| Reaction time (min.) | 2 | 2 |
| Product composition | | |
| Exo structure (mole %) | 0.63 | 0.9 |
| Total primary structure (mole %) | 0.72 | 0.98 |
| Unreacted isoprene (mole %) | 0 | 0 |
| Hydrobrominated structure (mole %) | 0.04 | 0.07 |
| Bromine content (wt. %) | 1.12 | 1.55 |
| Total primary structure as % of total bromine present (%) | 94.7 | 93.3 |
| Total primary structure as % of bound 1,4-isoprene of original polymer (%) | 94.7 | 93.3 |
| Stress-strain data (vulcanize at 166° C.) | | |
| Vulcanization time (min.) | 16 | 13 |
| 100% modulus (MPa) | 1.1 | 1.2 |
| 300% modulus (MPa) | 4.2 | 4.5 |
| Tensile strength (MPa) | 10.7 | 11.6 |
| Elongation (%) | 665 | 660 |

TABLE III

| Expt. # | 9 |
|---|---|
| Wt. of polymer (g) | 580 |
| Isoprene content of polymer (mole %) | 1.8 |
| Volume of solvent (ml) | 7780 |
| Reaction time (min.) | 4 |
| Product composition | |
| Exo structure (mole %) | 0.69 |
| Total primary structure (mole %) | 0.77 |
| Unreacted isoprene (mole %) | 0.91 |
| Hydrobrominated structure (mole %) | 0.08 |
| Bromine utilization (mole %) | 86 |

TABLE IV

| Expt. # | 10 | 11 | 12 |
|---|---|---|---|
| Solvent-hexane (ml) | 270 | 190 | 190 |
| -dichloroethane (ml) | — | 80 | 80 |
| -$H_2O$ (ml) | 18 | 18 | — |
| -NaOCl/$H_2O$ (ml) | — | — | 18 |
| Product composition | | | |
| Exo structure (mole %) | 0.60 | 0.86 | 1.27 |
| Total primary structure (mole %) | 0.66 | 0.93 | 1.42 |
| Unreacted isoprene (mole %) | 0.94 | 0.72 | 0.32 |
| Hydrobrominated structure (mole %) | 0.17 | 0.12 | 0.04 |
| Bromine utilization (mole %) | 67.6 | 95.5 | 146.4 |
| Total primary structure as % of total bromine present (%) | 79.5 | 88.2 | 97.5 |
| Total primary structure as % of bound 1,4-isoprene of original polymer (%) | 37.3 | 52.5 | 80.2 |

TABLE V

| Expt. # | 13 | 14 |
|---|---|---|
| Solvent-hexane (ml) | 190 | 190 |
| -carbon tetrachloride (ml) | 80 | 80 |
| -$H_2O$ (ml) | 18 | — |
| -NaOCl/$H_2O$ (ml) | — | 18 |
| Product composition | | |
| Exo structure (mole %) | 0.57 | 0.62 |
| Total primary structure (mole %) | 0.64 | 0.83 |
| Unreacted isoprene (mole %) | 1.02 | 0.85 |
| Hydrobrominated structure (mole %) | 0.11 | 0.09 |
| Bromine utilization (mole %) | 65.6 | 85.4 |
| Total primary structure as % of total bromine present (%) | 85.2 | 90 |
| Total primary structure as % of bound 1,4-isoprene of original polymer (%) | 36.2 | 46.9 |

DEFINITIONS

The term inert in relation to halogenated solvents means solvents that are inert with respect to reaction with bromine under the conditions of bromination.

It is of course, understood that the above examples are submitted merely to illustrate the invention and there is no intention to limit the invention to them. Resort may be had to various modifications and variations of the present invention without departing from the spirit of the discovery or the scope of the appended claims.

What is claimed is:

1. A $C_4$–$C_6$ isoolefin-$C_4$–$C_6$ conjugated diolefin, wherein said isoolefin-conjugated diolefin polymer is an isobutylene-isoprene polymer comprising from about 97 to 99.5 mole percent of isobutylene and from about 0.5 to about 3 mole percent of isoprene, wherein a solution of said polymer is prepared in a solvent, bromine is added to said solution and said bromine is reacted with said polymer at a temperature of from about 20° C. to about 50° C. and the brominated isoolefin-conjugated diolefin polymer is separated, wherein the brominated isobutylene-isoprene polymer contains from about 1 to about 4 weight percent of bromine based on the brominated polymer and not less that about 80 percent of the bound bromine atoms are present in a form suitable to participate in the vulcanization of said polymer and not less than about 70 percent of the 1,4-isoprene units in the original isobutylene-isoprene polymer are converted in the brominated polymer into a form suitable to participate in the vulcanization of said polymer, the improvement being that said solvent is a mixture comprising an inert saturated paraffinic hydrocarbon and an inert halogen-containing hydrocarbon in a volume ratio of from about 90/10 to about 10/90 of said paraffinic hydrocarbon to said halogen-containing hydrocarbon, wherein said halogen-containing hydrocarbon is selected from the group consisting of methyl chloride, methylene chloride, ethyl chloride, ethyl bromide, dichloroethane, n-butyl chloride and monochlorobenzene and said paraffinic hydrocarbon is selected from the group consisting of pentane, hexane and heptane, the reaction time is from about 1 to about 5 minutes.

2. A $C_4$–$C_6$ isoolefin-$C_4$–$C_6$ conjugated diolefin according to claim 1, where said volume ratio is from about 90/10 to about 50/50.

3. A $C_4$–$C_6$ isoolefin-$C_4$–$C_6$ conjugated diolefin according to claim 2, where said volume ratio is from about 90/10 to about 70/30.

4. The $C_4$–$C_6$ isoolefin-$C_4$–$C_6$ conjugated diolefin of claim 1 wherein the solvent further contains up to 20 volume percent of water.

5. The $C_4$–$C_6$ isoolefin-$C_4$–$C_6$ conjugated diolefin of claim 1 wherein the solvent further contains up to 20 volume percent of an aqueous solution of sodium hypochlorite, the amount of sodium hypochlorite being equivalent to not more than about 200 percent of the moles of bromine added.

* * * * *